United States Patent
Zia et al.

(10) Patent No.: US 11,321,516 B2
(45) Date of Patent: May 3, 2022

(54) PROCESSING DYNAMIC WEB CONTENT OF AN ISO BMFF WEB RESOURCE TRACK

(71) Applicant: QUALCOMM Incorporated, San Diego, CA (US)

(72) Inventors: Waqar Zia, Munich (DE); Charles Nung Lo, San Diego, CA (US); Thomas Stockhammer, Bergen (DE); Giridhar Dhati Mandyam, San Diego, CA (US); Ye-Kui Wang, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/250,776

(22) Filed: Jan. 17, 2019

(65) Prior Publication Data

US 2019/0243881 A1    Aug. 8, 2019

Related U.S. Application Data

(60) Provisional application No. 62/636,701, filed on Feb. 28, 2018, provisional application No. 62/619,641, (Continued)

(51) Int. Cl.
*G06F 16/955* (2019.01)
*G06F 40/143* (2020.01)
(Continued)

(52) U.S. Cl.
CPC .......... *G06F 40/143* (2020.01); *G06F 16/955* (2019.01); *G06F 16/986* (2019.01);
(Continued)

(58) Field of Classification Search
None
See application file for complete search history.

(56) References Cited

U.S. PATENT DOCUMENTS 9,854,375 B2 * 12/2017 Stockhammer .... H04N 21/8106
10,334,309 B2    6/2019 Guo et al.
(Continued)

FOREIGN PATENT DOCUMENTS

CN    101593184 A    12/2009
CN    105874803 A    8/2016
(Continued)

OTHER PUBLICATIONS

Berners-Lee T., et al., "Uniform Resource Identifier (URI): Generic Syntax", Network Working Group; Request for Comments: 3986 STD: 66 Updates 1738 Obsoletes: 2732, 2396, 1808 Category: Standards Track; W3C/MIT R Fielding Day Sotware L Masinter Adobe Systems, Jan. 2005, 61 pages.
(Continued)

*Primary Examiner* — Maikhanh Nguyen
(74) *Attorney, Agent, or Firm* — Shumaker & Sieffert, P.A.

(57) ABSTRACT

In one example, a device for retrieving media data includes a memory configured to store an ISO Base Media File Format (ISO BMFF) file including one or more samples including hypertext markup language (HTML) elements defining dynamic web content, and a processing unit implemented in circuitry and configured to: retrieve the ISO BMFF file, extract the HTML elements from the samples of the file, and processing the HTML elements to present the dynamic web content. The HTML elements may include JavaScript elements. The processing unit may also present the dynamic web content in a manner that is synchronized with corresponding media data.

48 Claims, 8 Drawing Sheets

Related U.S. Application Data filed on Jan. 19, 2018, provisional application No. 62/663,112, filed on Apr. 26, 2018.

(51) Int. Cl.
*H04N 21/435* (2011.01)
*G06F 40/197* (2020.01)
*G06F 16/958* (2019.01)
*H04L 67/02* (2022.01)
*H04L 67/568* (2022.01)

(52) U.S. Cl.
CPC ............ *G06F 40/197* (2020.01); *H04L 67/02* (2013.01); *H04L 67/2842* (2013.01); *H04N 21/435* (2013.01)

(56) References Cited

U.S. PATENT DOCUMENTS

| | | | |
|---|---|---|---|
| 10,693,936 B2* | 6/2020 | Stockhammer | H04N 21/845 |
| 2016/0198012 A1* | 7/2016 | Fablet | H04L 67/02 709/231 |
| 2016/0267879 A1 | 9/2016 | Champel et al. | |
| 2016/0337424 A1* | 11/2016 | Mandyam | H04N 21/26258 |
| 2016/0373498 A1* | 12/2016 | Mandyam | G11B 27/10 |
| 2017/0063960 A1* | 3/2017 | Stockhammer | H04N 21/8106 |
| 2017/0093939 A1 | 3/2017 | Bar-Mashiah et al. | |
| 2018/0160156 A1* | 6/2018 | Hannuksela | H04N 21/8456 |
| 2018/0213294 A1 | 7/2018 | Lau et al. | |
| 2018/0359328 A1* | 12/2018 | Fablet | H04L 65/4084 |
| 2019/0020915 A1 | 1/2019 | Stockhammer et al. | |
| 2020/0053435 A1* | 2/2020 | Denoual | H04N 21/26258 |

FOREIGN PATENT DOCUMENTS

| | | |
|---|---|---|
| WO | 03098475 A1 | 11/2003 |
| WO | 2008115344 A1 | 9/2008 |
| WO | 2014172654 A1 | 10/2014 |
| WO | 2016182844 A1 | 11/2016 |
| WO | 2016205768 A1 | 12/2016 |
| WO | 2017140939 A1 | 8/2017 |

OTHER PUBLICATIONS

Cha R., et al., "Improved Combined Inter-intra Prediction Using Spatial-Variant Weighted Coefficient," International Conference on Multimedia and Expo (ICME), Jul. 11, 2011, pp. 1-5, XP031964687.
Chen Y., et al., "A Pre-filtering Approach to Exploit Decoupled Prediction and Transform Block Structures in Video Coding," IEEE International Conference on Image Processing (ICIP), Oct. 27-30, 2014, Oct. 1, 2014, pp. 4137-4140, XP055299349.
Chen Y., et al., "Joint Inter-Intra Prediction based on Mode-variant and Edge-directed Weighting Approaches in Video Coding," IEEE International Conference on Acoustics, Speech and Signal Processing (ICASSP), May 4, 2014, pp. 7372-7376, XP032617571, [retrieved on Jul. 11, 2014].
Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0036, Oct. 2, 2012 (Oct. 2, 2012), XP030112968, pp. 1-21.
Concolato C., "Carriage of Timed Subtitles and Graphics in MP4", Jul. 19, 2012, pp. 1-7, XP055574236, Retrieved from the Internet: URL: https://www.slideshare.net/cconcolato/carriage-of-timed-subtitles-and-graphics-in-mp4 [retrieved on Mar. 26, 2019] p. 2, paragraph 2—p. 3, paragraph 13.
Debargha M., et al., "An Overview of New Video Coding Tools Under Consideration for VP10: the Successor to VP9," Visual Communications and Image Processing, vol. 9599, Sep. 22, 2015, pp. 95991E-1 to 95991E-12, XP060060839.
Fielding, et al., "Hypertext Transfer Protocol—HTTP/1.1," Network Working Group, Request for Comments: 2616, Obsoletes: 2068, Category: Standards Track, Jun. 1999, 122 pages.
"Information technology—Dynamic adaptive streaming over HTTP (DASH)—Part 1: Media presentation description and segment formats," International Standard ISO/IEC 23009-1, Apr. 2012, 132 pp.
International Search Report and Written Opinion—PCT/US2019/014196—ISA/EPO—dated May 28, 2019.
International Standard, "Information technology—Coding of audio-visual objects—Part 15: Carriage of network abstraction layer (NAL) unit structured video in the ISO base media file format," ISO/IEC FDIS 14496-15:2014(E), Jan. 13, 2014, 179 pages.
International Standard ISO/IEC 14496-12, Information Technology—Coding of audio-visual objects—Part 12: ISO base media file format, Third Edition, Oct. 15, 2008, 120 pp.
"ISO/IEC 14496-30 Timed Text and other visual overlays in ISO Base Media File Format", Oct. 2012, 17 pages.
ISO/IEC 23008-12: 2017 "Information technology—High Efficiency Coding and Media Delivery in Heterogeneous Environments—Part 12: Image File Format", Dec. 2017, 82 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp.
Kim I-K., et al., "Coding Efficiency Comparison of New Video Coding Standards: HEVC vs VP9 vs AVS2 Video," IEEE International Conference on Multimedia and Expo (ICME), Jul. 14, 2014, pp. 1-6, XP032639340, [retrieved on Sep. 3, 2014].
Paila T., et al., "FLUTE—File Delivery over Unidirectional Transport," Network Working Group, RFC 6726, Nov. 2012, 46 Pages, Retrieved from the Internet http://tools.ietf.org/html/rfc6726.
Partial International Search Report—PCT/US2019/014196—ISA/EPO—dated Apr. 4, 2019.
Pfeiffer S., et al., "Sourcing In-band Media Resource Tracks from Media Containers into HTML", Apr. 26, 2015, 21 pages.
Wikipedia: "Dynamic HTML", retrieved from Internet on Jul. 31, 2019, 4 pages.
ISO: "ISO/IEC 14496-12 Information Technology—Coding of Audio-Visual Objects—Part 12: ISO Base Media File Format", 5th Edition, Dec. 15, 2015, XP055836373, 248 Pages.
Stockhammer T., et al., "WD on Carriage of Web Resource in ISOBMFF", 119. MPEG Meeting, Jul. 17, 2017-Jul. 21, 2017, Torino, (Motion Picture Expert Group or ISO/IEC JTC1/SC29/WG11), No. n16944, Jul. 29, 2017, XP030023607, 12 pages, Retrieved from the Internet: URL: http://phenix.int-evry.fr/mpeg/doc_end_user/documents/119_Torino/wg11/w16944.zip w16944-WD Interactivity.docx.

* cited by examiner

PROCESSING DYNAMIC WEB CONTENT OF AN ISO BMFF WEB RESOURCE TRACK

This application claims the benefit of U.S. Provisional Application 62/619,641, filed Jan. 19, 2018, U.S. Provisional Application 62/636,701, filed Feb. 28, 2018, and U.S. Provisional Application No. 62/663,112, filed Apr. 26, 2018, which are hereby incorporated by reference in their entireties.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) Base Media File Format (BMFF) and extensions thereof, such as AVC.

SUMMARY

In general, this disclosure describes techniques for processing dynamic web content of an ISO Base Media File Format (ISO BMFF) file, or other such file. In particular, the dynamic web content may be included in a web resource track of an ISO BMFF file. The dynamic web content may be defined by HTML elements, such as, for example, JavaScript elements.

In one example, a method of processing media data includes retrieving an ISO Base Media File Format (ISO BMFF) file including one or more samples including hypertext markup language (HTML) elements defining dynamic web content, extracting the HTML elements from the samples of the file, and processing the HTML elements to present the dynamic web content.

In another example, a device for processing media data includes a memory configured to store an ISO Base Media File Format (ISO BMFF) file including one or more samples including hypertext markup language (HTML) elements defining dynamic web content; and a processing unit implemented in circuitry and configured to: retrieve the ISO BMFF file; extract the HTML elements from the samples of the file; and process the HTML elements to present the dynamic web content.

In another example, a device for processing media data includes means for retrieving an ISO Base Media File Format (ISO BMFF) file including one or more samples including hypertext markup language (HTML) elements defining dynamic web content, means for extracting the HTML elements from the samples of the file, and means for processing the HTML elements to present the dynamic web content.

In another example, a computer-readable storage medium having stored thereon instructions that, when executed, cause a processor to: retrieve an ISO Base Media File Format (ISO BMFF) file including one or more samples including hypertext markup language (HTML) elements defining dynamic web content, extract the HTML elements from the samples of the file, and process the HTML elements to present the dynamic web content.

The details of one or more examples are set forth in the accompanying drawings and the description below. Other features, objects, and advantages will be apparent from the description and drawings, and from the claims.

DETAILED DESCRIPTION

Figure 1:
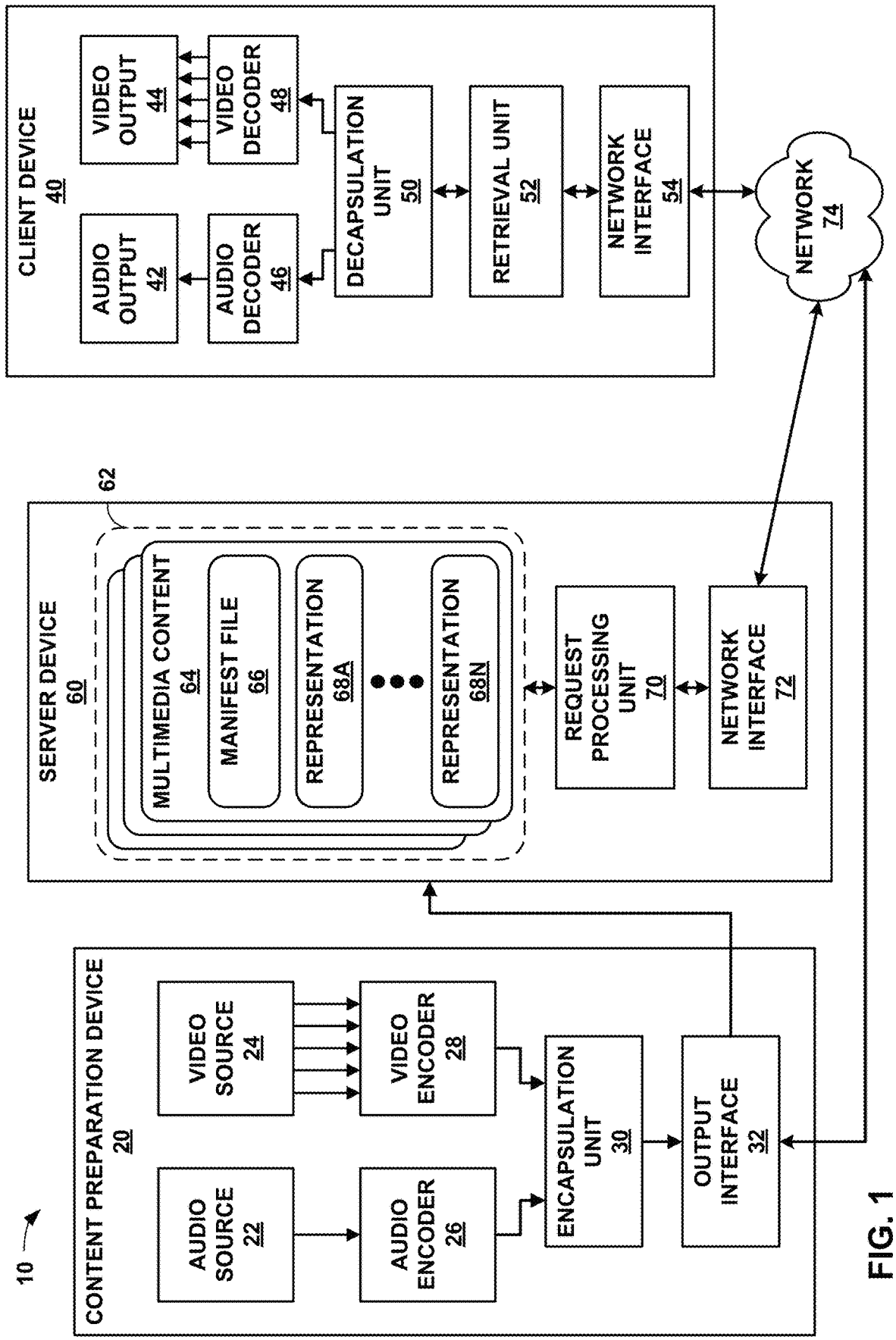
FIG. 1 is a block diagram illustrating an example system that implements techniques for streaming media data over a network.

In general, this disclosure describes techniques for constructing and using files (e.g., conforming to ISO Base Media File Format (ISO BMFF) or similar formats) including one or more tracks for carrying both media data and web content. More particularly, a file format processor (e.g., a file encapsulator or decapsulator) may process files including a track for carrying web resources including dynamic webpage data.

ISO/IEC 14496-12, "ISO Base Media File Format," Fifth Edition, Feb. 20, 2015, available at mpeg.chiariglione.org/standards/mpeg-4/iso-base-media-file-format/text-isoiec-14496-12-5th-edition, specifies a format for the storage of timed resources such as media streams and resources for which no timed stream structure exists or when the timed stream structure does not need to be exposed.

Stockhammer & Concolato, "WD on Carriage of Web Resource in ISOBMFF (ISO/IEC 23001-15)," ISO/IEC JTC1/SC29/WG11, Document N17242, October 2017 ("N17242"), puts forward track types and processing models to support the carriage of Web Resources. This disclosure describes techniques that may be used in specific uses case where the track of N17242 can be used to deliver a dynamic webpage to a client side device. The track format and the basic processing model follows the idea presented in N17242. N17242 is attached to this provisional application as Appendix A, following the claims.

This disclosure describes techniques for how this format can be used to store Web resources and to define associated brands. This disclosure also specifies how to handle references from these Web resources to an ISO BMFF file that carries them. In this manner, this disclosure describes techniques that enable delivery of synchronized media and web resources as supported by ISO/IEC 14496-12 for file download, progressive file download, streaming, broadcasting, or the like. It is assumed that an ISO BMFF file contains sufficient information such that the ISO BMFF file can be played back in a regular browser. No presentation processing model for Web data is defined, and the presentation may be owned by the web browser.

This disclosure also describes techniques for signaling required Web capabilities to process such an ISO BMFF file. These techniques may be performed in a way that web profiles defined by other organizations may be signaled in a dedicated box, e.g., the MIME Box, similar to the techniques of Singer et al., "Timed Text and other visual overlays in ISO Base Media File Format," ISO/IEC 14496-30, October 2012, available at mpeg.chiariglione.org/standards/mpeg-4/timed-text-and-other-visual-overlays-iso-base-media-file-format/isoiec-14496-30.

The techniques of this disclosure can be practiced without a special web profile.

Storage of web resources (HTML, JavaScript . . . ) can be done using tracks when timed decoding and presentation is desired, including operations such as seeking, fast forwarding, trick play, etc. In such cases, it is assumed that a Web resource carried in a sample is to be processed (e.g., parsed and interpreted) by a web resource processor (e.g., a web browser) at the sample presentation time. This allows Web processing (e.g., rendering or JavaScript execution) to be synchronized with other tracks such as audio/video/subtitles tracks. More details on the processing of these tracks are given with respect to the example hypothetical processing model of FIG. 5, as discussed in greater detail below.

Several types of tracks may be used for different purposes. First, tracks delivering HTML content that may be used as overlay when playing the other media tracks and that may change over time. Such tracks should not reference the other media tracks (audio, video). HTML content carried may instead reference the other media tracks (audio, video . . . ). This kind of track may also be used to simply provide advanced image overlay.

A second type of track is tracks delivering JavaScript code. This code may be evaluated in the context of an HTML document, previously loaded either by the application prior to the loading of the ISO BMFF file, by the loading of a sample from the previous type of track, or by the loading of an item.

A third type of track is tracks delivering metadata, as specified in HTML, to be used by internal page JavaScript code, previously loaded either by the application prior to the loading of the ISOBMFF file, or by the loading of a sample from the previous type of track, or by the loading of an item.

A fourth type of track is tracks that are a combination of the above first, second, and/or third types of tracks, possibly also allowing that the HTML-5 track takes control over the media streams, for example for framing, picture-in-picture, etc.

Two models for dependencies between tracks may be used according to the techniques of this disclosure. In one model, a track is self-contained, and has no dependency to any parent HTML. For example, the track may be an HTML track that can be rendered on its own, or it is a JavaScript track that does not dispatch any event, but executes code. This can be the case, for example, if the JavaSscript code creates an overlay using the Canvas API, but also if it does not assume any specific HTML (but only an empty HTML <html><body></body></html>) and creates all the HTML elements. In this case, no HTML entry point is required.

Another model is that the track has dependency on some outer context. For example, the track may be a JavaScript track and only contain calls to functions defined somewhere else. Alternatively, the track may be a Web Video Text Track (WebVTT) Format track, and the associated processing may be contained in a JavaScript file. In that case, the track cannot be used without the surrounding context, the HTML, and JavaScript. Therefore, an HTML/JS entry point is required and should be in the same ISO BMFF file.

A single file may contain multiple Web-based tracks. The processing of some tracks (e.g. JavaScript) may be required by some other tracks (e.g., HTML tracks). The selection of which sets of independent tracks to play is implementation specific. It may be done based on metadata also given in the file (profile capabilities, language information) or based on user input (e.g. through a GUI).

Web data may be frequent. For example, web data may include updates on almost every sample. Alternatively, web data may be quite sparse. This disclosure addresses the definition of web timed data and the representation in a track format in the file format. Alternatives may be considered if the definition of the web data is sparse and by this constraint, the representation as a track causes other issues, for example, if the transport disallows the use of multiplexed tracks.

In the latter case it may be considered that the sparse web data track may be mapped to different structures in order to enable such multiplexing. Examples are the use of MetaBoxes in movie fragments or the use of EventMessageBoxes. Such an approach may also address issues with fragmented tracks having no samples for a long period of time or the issue of undetermined sample durations when the next sample is at an arbitrary later time, not known at the time of production as happening in live streaming applications.

As specified in ISO/IEC 14496-30, unless specified by an embedding environment (e.g., by an HTML page delivered out-of-band or delivered in-band and identified as the file entry point), the layout of tracks, including overlay HTML tracks and images, is specified using the TrackHeaderBox of the different tracks.

In some examples, the brand 'htmt' is used to signal the presence of tracks (e.g., Overlay HTML tracks) with the following constraints:

The track handler type shall be 'text'
The sample entry format shall be 'stxt' and:
    its mime_format field shall be set to 'text/html' or 'application/xhtml+xml', its content_encoding field shall contain either an empty string or a value allowed in HTTP's Content-Encoding header Each sample contains HTML code, and may be marked as one of the following:
   as a sync sample (either using the 'stss' box or using the sample_depends_on flag set to 2)
   as redundant sync sample with the sample_has_redundancy flag set to 1

Loading a HTML sample may be equivalent to navigating to the document contained in the new sample. The handling of such information in browsers may be implementation specific, but treating the information as user navigation and, for example, capturing the information in the browser history should be avoided. Seeking into a sample at a specific presentation time may be equivalent to seeking to the beginning of the sample, i.e. no processing is expected.

In some examples, the brand 'hjst' is used to signal the presence of tracks (e.g., JavaScript tracks) with the following constraints:
   The track handler type shall be 'meta'
   The sample entry format shall be 'stxt' and:
      its mime_format field shall be set to 'application/javascript' or 'text/javascript',
      its content_encoding field shall contain either an empty string or a value allowed in HTTP's Content-Encoding header
   Each sample contains JavaScript code and shall be marked as one of the following:
      as a sync sample (either using the 'stss' box or using the sample_depends_on flag set to 2)
      as redundant sync sample with the sample_has_redundancy flag set to 1

In some examples, the brand 'hvtt' is used to signal the presence of tracks (e.g., WebVTT Metadata tracks) with the following constraints:
   The track handler type shall be 'meta'
   The sample entry format shall be 'wvtt', as specified in ISO/IEC 14496-30 and:
      its config value shall be "WEBVTT\r\n"
   The config should contain the header "kind: metadata". In this case
      the KindBox shall be present in a UserDataBox in the TrackBox with the following values:
      schemeURI: about:html-kind, as specified in HTML
      value: metadata, as specified in HTML
   Each sample shall contain text cues and shall be marked as one of the following:
      as a sync sample (either using the 'stss' box or using the sample_depends_on flag set to 2)
      as redundant sync sample with the sample_has_redundancy flag set to 1

Images are important web resources. Image tracks, as specified in ISO/IEC 14496-12 or ISO/IEC 23008-12, can be used to provide image overlays. Overlay HTML tracks as specified may also be used to provide advanced image overlays, without interactivity, when the HTML content reference images (either in tracks or as items).

Web resources can be stored as items, when there is no specific time associated to the loading of that resource (entry point CSS, HTML, JS). Items may be declared in MetaBox which can be placed in the movie header. The MetaBox may be used in the movie header or in movie fragment headers.

In some examples, the brand 'htmi' may be used to signal the use of a MetaBox with the following constraints:
   It shall present at the file level
   It shall use a HandlerBox with the handler_type set to 'html'
   It shall contain a PrimaryItemBox which declares as primary item a resource of type 'text/html', or 'application/xhtml+xml',
   It shall not use any DataInformationBox, ItemProtectionBox or IPMPControlBox
   It shall use a ItemInformationBox with the following constraints:
      its version is either 0 or 1
      each item is described by an ItemInfoEntry with the following constraints:
         its version is set to 0
         its item_protection_index is set to 0
         if the item is referred to by a URL in the content of another item, its item_name is equal to that URL.
   It shall use an ItemLocationBox with the following constraints:
      its version is set to 1 or 2
      each item is described by an entry and values 0, 1 or 2 may be used for the construction method
   it may use any other boxes (such as ItemReferenceBox) not explicitly excluded above If Web resources are embedded in an ISO/IEC 14496-12 file (either in track samples or items as described above), and if any of these resources contains URLs to other resources also embedded in the same ISO BMFF file (including to the ISO BMFF file itself (e.g. in a video tag)), the following constraints may apply on the file:
   A MetaBox shall be present at the file level with the following constraints
      For each URL to a resource embedded in the ISOBMFF file, the item_name for the item corresponding to that resource shall be set to that URL
      Absolute URLs may be used
      Relative URLs may be used. If relative URLs are used, the Base URL of the including resource defines the Base URL. Reference resolution following RFC 3986 shall be used.
      If a resource embedded in the ISOBMFF file uses a URL to that same ISOBMFF file, an additional item shall be added whose item_name is set to that URL and the item location describes the entire file (offset: 0, length entire)

The techniques of this disclosure may be applied to video files conforming to video data encapsulated according to any of ISO BMFF, Scalable Video Coding (SVC) file format, Advanced Video Coding (AVC) file format, Third Generation Partnership Project (3GPP) file format, and/or Multiview Video Coding (MVC) file format, or other similar video file formats.

The techniques of this disclosure address certain problems related to processing dynamic web content included in a web resource track of a file, e.g., an ISO BMFF file. For example, this disclosure describes sample data of the web resource track so that the web resource track can carry web page data in a fragmented ISO BMFF file. To achieve this, this disclosure describes example specifications of what information is carried. For example, a common data track may be carried in the movie and track header, as sync samples, and data to impact a document object model (DOM) in between sync samples as non-sync samples. As another example, a common data track may be carried in the movie and track header, and data to impact a DOM may be carried as (potentially redundant) sync samples and/or as non-sync samples. This disclosure also describes a processing model for client device-side techniques related to how a web resource decoding function of the client device can differentiate between various sample types and, hence, process samples of various types correctly and/or make use of an appropriate one of a plurality of different types of information, e.g., the three types discussed above.

The value (sometimes referred to as "brand") "dhtm" may be used to signal the presence of tracks, such as dynamic HTML or HTML5 tracks, with the following constraints, in one example:

The track handler type shall be 'text'
The sample entry format shall be 'stxt' and:
its mime_format field shall be set to 'text/html' or 'application/xhtml+xml',
its content_encoding field shall contain either an empty string or a value allowed in HTTP's Content-Encoding header The 'meta' information box under the initial 'moov' box shall contain a conforming HTML document that shall make use of the samples in the track.

The HTML document typically contains a JavaScript section that uses the samples according to the decode time of the track, typically synchronously with other media in the same file. Two example ways are defined on how the samples may be accessed by the webpage: either through XMLHttpRequest (XHR) fetched from a local cache or through a local Web Socket communication. XHR is an API that allows for transfer of data between a web browser and a server, which may be a local proxy server.

Samples that are to be fetched from a local cache using XHR may be made available to the requesting user agent or web page no later than at the sample decode time. Upon the action of initial playback, seek, or tune-in etc., if the initial webpage logic needs to fetch sample data using XHR, it may use URL template information as specified below to reconstruct the URL of the sample. In some examples, a redundant sync sample is placed in the cache for access only once if the playback is started from a redundant sync sample.

In some examples, a web resource track carries sample name and location information. This information may be in the form of a URL of the sample. Due to security considerations, the name and location may be relative to the fully qualified host name of the initial webpage or the initial file. There can be several methods of carrying the name and location information. The track header may carry the type of the sample data and how the URL is generated. Three example options are presented below, and for each, the track header may indicate which one to use:

1) In one example, the relative URL of each sample is carried in a box in each movie fragment carrying the sample itself. An example of the syntax and semantics of the box structure used to deliver this information is specified below. Alternatively, the sample itself may be an HTTP entity that includes both, the entity header as well as entity body. In the latter case, the track header includes the information that each sample is an HTTP entity with the HTTP header carried inside.

2) In another example, a track header includes a template URL that enables substitution of the sample number to the template to create sample URLs. Example syntax and semantics of the box structure used to deliver number-based template information is specified below. In this case, $number$ would be substituted by a number starting from 0 and incrementing by 1 for each following sample. Additionally, if sample_max_num is present, the increment is modulo sample_max_num. If sample_max_num is present, the total duration of samples placed in the cache shall not exceed the duration of last sample_max_num samples to avoid a wrap-around overwrite of cached samples.

3) In another example, the track header contains a time-based URL template, whereby the URL and the name of the sample is reconstructed by substituting the decode time of the sample in the template. In this case, the track header includes a template URL that enables adding the decode time to the template to create a unique URL. The syntax and semantics of the box structure used to deliver this information is specified below. In this case, $time$ would be substituted by the decode time of the sample.

If the web resource track carries sample data that is to be pushed to the user agent for inclusion in the initial webpage using a Web Socket, the Web Socket address may be carried by the web resource track header. For example, the Web Socket address may be carried in a box under the movie box or as part of media information as specified below.

Example Sample URL Box syntax and semantics are provided below:

Definition:
Box Type: 'surl'
Container: Track Fragment Box ('traf')
Mandatory: No
Quantity: Zero or more
Sample URL Box carries the needed ISO BMFF relative URLs for the samples in the track fragment.
Syntax:

```
aligned(8) class SampleURLBox
    extends FullBox('surl', version =0) {
    unsigned int(32) sample_count;
    {
        string sample_url;
    }[ sample_count ]
}
```

Semantics:
sample_url: the relative URL of the sample.
Example syntax and semantics for a web resource media header are provided below:
Definition:
Box Types: 'wmhd'
Container: Media Information Box ('minf')
Mandatory: Yes
Quantity: Exactly one
Web resource tracks use of the information carried by the WebMediaHeaderbox in the media information box hierarchy. The web media header contains information that enable the decoder to reconstruct the relative URL of a sample, and semantics/or the URL of the Web Socket from where the initial Webpage receives sample data.
The following flags are defined:
0x000001 sample-url-template-present.
0x000002 sample-max-num-present
0x000004 web-socket-present.
Syntax:

```
aligned(8) class WebMediaHeaderBox
    extends FullBox('wmhd', version = 0, flags) {
    if (sample-url-template-present)
    {
        string sample_url_template;
    }
    if (sample-max-num-present)
```

-continued

```
{
   uint(32) sample_max_num;
}
If (web-socket-present)
{
string web_socket;
}
}
```

Semantics:

redundant_sync_url is the relative URL for any redundant sync in the track.

sample_url_template carries the URL template for sync and non-sync samples of the track. This string shall contain either $number$ or $time$.

sample_max_num carries the number modulo which $number$, if signalled, is incremented, starting from 0.

web_socket carries the web socket URL to send the sample data on.

To understand what the different samples of the web resource track, it is relevant to understand how client-side dynamic webpages (webpages that change dynamically on the clients-side) work. The most commonly known realization of such web-pages is HTML content that is updated by using JavaScript. A very simple example (from en.wikipedia.org/wiki/Dynamic_HTML#Example:_Displaying_an_additional_block_of_text) of such a webpage is the following:

```
<!doctype html >
<meta charset="utf-8">
<title>Using a DOM function</title>
<style>
   a { background-color:#eee; }
   a:hover { background:#ff0; }
   #toggleMe { background:#cfc; display:none;
      margin:30px 0; padding: 1 em; }
</style>
<h1>Using a DOM function</h1>
<h2><a id="showhide" href="#">Show paragraph</a></h2>
<p id="toggleMe">This is the paragraph that is only displayed on request.
<p>The general flow of the document continues.
<script>
   function changeDisplayState(id) {
      var d = document.getElementById('showhide'),
         e = document.getElementById(id);
      if (e.style.display === 'none' || e.style.display ===''){
         e.style.display = 'block';
         d.innerHTML = 'Hide paragraph';
      } else {
         e.style.display = 'none';
         d.innerHTML = 'Show paragraph';
      }
   }
   document.getElementById('showhide').addEventListener
      ('click', function (e)
{
      e.preventDefault( );
      changeDisplayState('toggleMe');
   });
</script>
```

One can see this example in action by plugging-in the example in the w3schools Tryit editor at www.w3schools.com/html/tryit.asp?filename=tryhtml_intro. Here, JavaScript can be used to update and add certain elements to the existing webpage.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, decapsulation unit 50 may be configured to differentiate between audio, video, and web content (e.g., HTML), including dynamic web content. Furthermore, decapsulation unit 50 may extract initialization information and sample types. Decapsulation unit 50 may be configured to extract dynamic webpage data that is packaged in a fragmented ISO BMFF file (or multiple files). In particular, the dynamic webpage data may be packaged in the form of a web resource track, as follows:

1. Any part of the html document not intended to be changed for a track should be included in the 'meta' information box under the initial 'moov' box.
2. A sync sample is an HTML element. Its identifier (id) is set to "urn:mpeg:webresource:sync:<id>", where <id> is an optionally added string. The string prefix "urn:mpeg:webresource:sync:" shall be removed from the id by the client application before using this element.
   a. If an element of same type exists in the document object model (DOM), this element replaces the existing element.
   b. If multiple elements of this type exist in the DOM, then:
      i. This element replaces the element in the DOM with the same <id>.
      ii. If this element does not contain an <id>, all the elements of the same type are replaced with this element.
3. A non-sync sample is an HTML element that is added to the HTML body. Its id is set to "urn:mpeg:webresource:nonsync:<id>", where <id> is an optionally added string. The string prefix "urn:mpeg:webresource:nonsync:" shall be removed from the id by the client application before using this element.

Accordingly, decapsulation unit 50 may determine that HTML data of a 'meta' information box under an initial 'moov' box does not change. Decapsulation unit 50 may also differentiate sync samples from non-sync samples using values of ids of the samples. That is, decapsulation unit 50 may determine that a sample having an id preceded by "urn:mpeg:webresource:sync:" is a sync sample, and that a sample having an id preceded by "urn:mpeg:webresource:nonsync:" is a non-sync sample. Likewise, decapsulation unit 50 may remote these preceding elements ("urn:mpeg:webresource:sync:" and "urn:mpeg:webresource:nonsync:") from the id before the corresponding element is used. Alternatively, a separate unit (e.g., a software application, such as a web client or other application) may be configured to remove the preceding elements from ids.

By having non-changing data in the 'meta' information box, gathering webpage data that is not intended to be changed in the initial movie box avoids retransmissions of a common data. Thus, these techniques may reduce processing requirements and prevent wasted network bandwidth that would otherwise be caused by retransmission. Furthermore, according to the techniques of this disclosure, any element (tag) of an HTML page can be sent as a sync sample, which allows for replacing one or more elements of the same type. This allows for changing a part of a webpage or the complete webpage using one or more sync samples. Moreover, according to the techniques of this disclosure, by using non-sync samples, more elements can be added to a webpage. It may be useful to add JavaScript to a webpage by using script elements as non-sync samples.

In some examples, gathering of web page data, which is not intended to change, in the initial movie box may avoid retransmission of common data. In some examples, a single conforming HTML document serves as the common starting point for any access into the track. Thus, no HTML "page refresh" is needed for initial play, seek, or other such operations. Instead, additional information contained in subsequent sync and non-sync samples may progressively build up the initial page.

A web resource decoding block may use the prefix of the id attribute of the sample above (where the prefix is, e.g., either "urn:mpeg:webresource:sync:" or "urn:mpeg:webresource:nonsync:") to distinguish between sync and non-sync samples. Thus, the web resource decoding block may remove the prefix, rather than decapsulation unit 50.

The techniques of this disclosure also support creation of an application based on a web resource track and an initial entry interface. A web-based entry interface may form part of an application where the user chooses to play an interactive stream. The interface may contain the JavaScript service worker, which is responsible for using the samples as defined by their roles, as discussed above.

The techniques of this disclosure also allow for in-band delivery of webpage-related files. That is, these techniques may allow samples of a web resource track to provide side data (icons, images, CSS, etc.) for rendering a webpage, and in particular, allow for delivery of such side data in-band, when desired by a content provider. In accordance with the techniques of this disclosure, in-band delivery of webpage-related files may be achieved by embedded related data of a webpage (images, CSS, etc.) directly into the HTML of the webpage. For example, images can be embedded directly into HTML. Such embedding may negatively impact compression efficiency, but not to a large degree considering the typical size of interactive webpages. For example, a base64 representation of a JPEG compressed image embedded in HTML may be larger than the original JPEG file. However, more testing and evaluation may provide a definitive answer based on targeted use cases. Moreover, by embedding related data in this manner, there is no need to resolve the relative paths of the associated resources (no need to resolve relative folders, etc.). Thus, these embedding techniques may reduce processing requirements and reduce latency of transporting web data.

Figure 2:
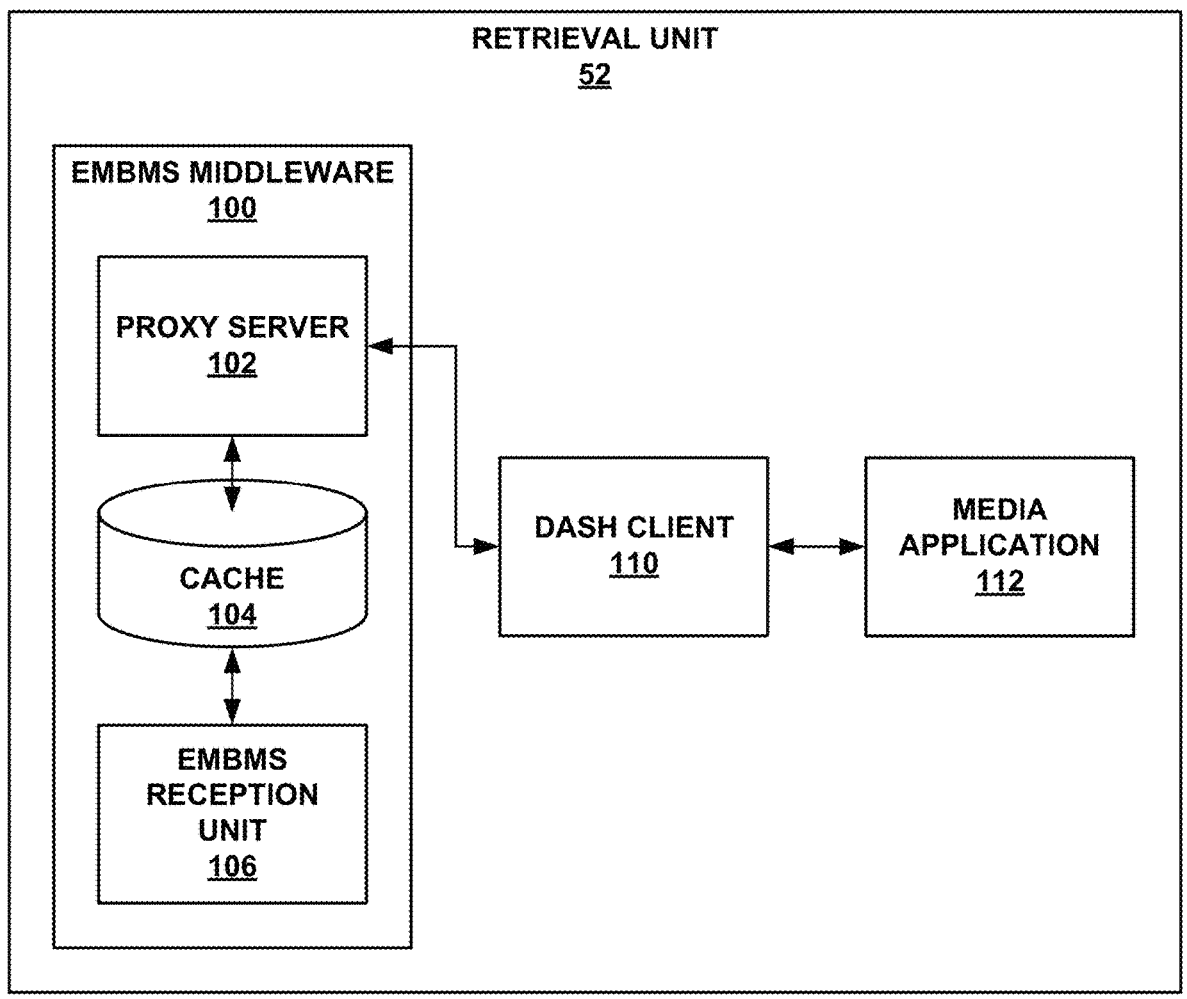
FIG. 2 is a block diagram illustrating an example set of components of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, the eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/repl/seg3, DASH client 110 may construct an HTTP GET request that includes a request for http://127.0.0.1/repl/seg3, and submit the request to proxy server unit 102. Proxy server unit 102 may retrieve requested data from cache 104 and provide the data to DASH client 110 in response to such requests.

Figure 3:
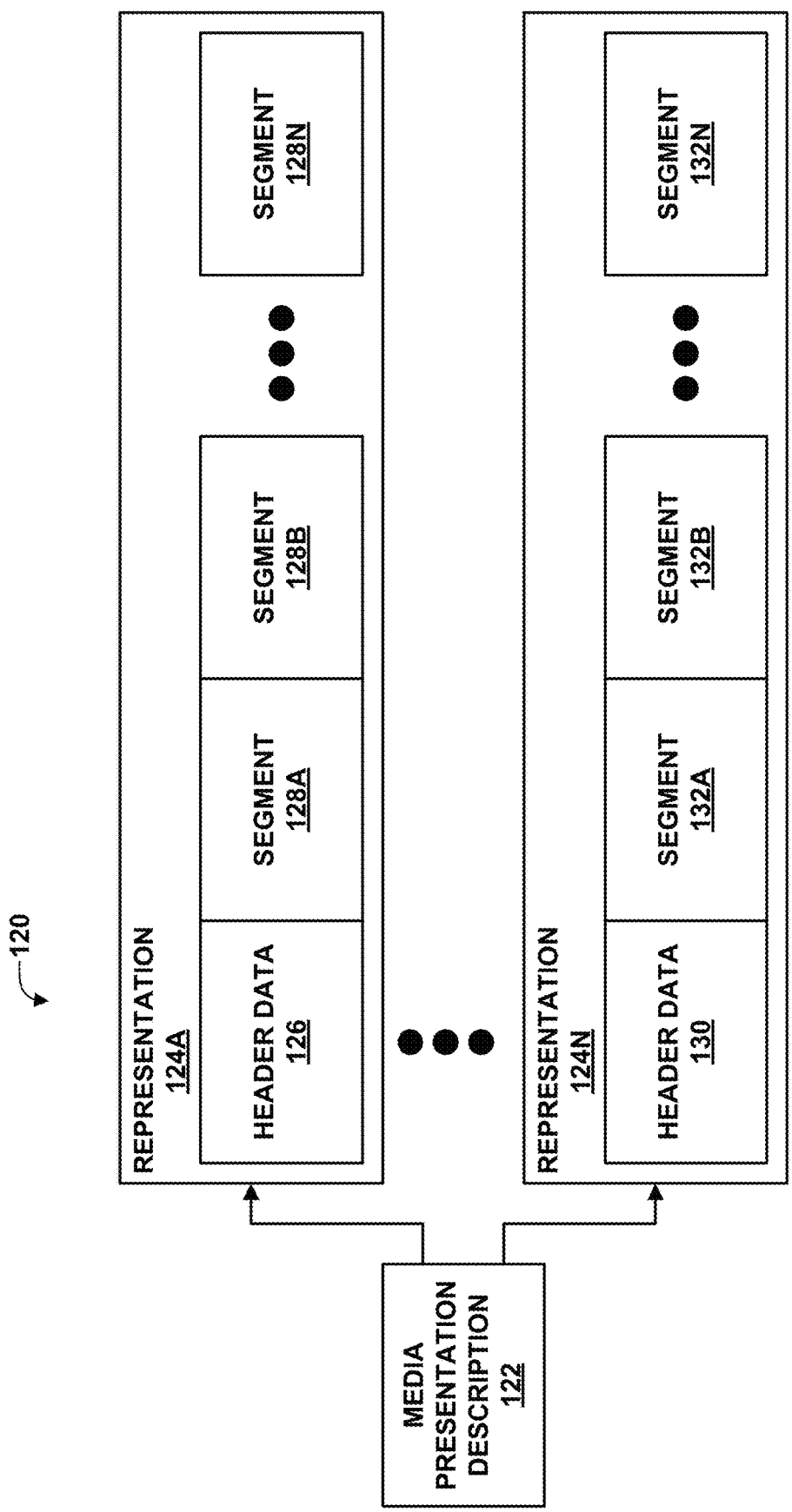
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
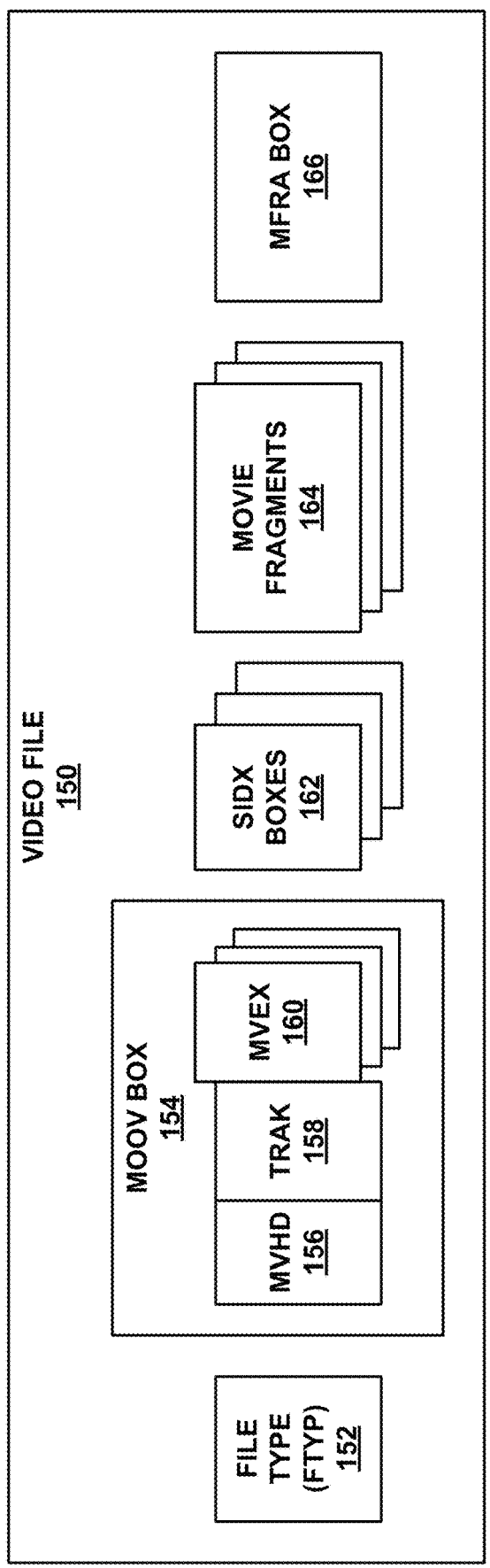
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may be placed before any of MOOV box 154, movie fragment boxes 164, and/or MFRA box 166, in various examples.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

Although not shown in FIG. 4, MOOV box 154 may further include a 'meta' information box. According to the techniques of this disclosure, the 'meta' information box may include any part of an HTML document that is not intended to be changed for a track. Accordingly, client device 40 may determine that any web content included in the 'meta' information box will not change (e.g., is immutable) for a corresponding track of video file 150. Likewise, content preparation device 20 may construct video file 150 to include non-changing (immutable) web content for a track in the 'meta' information box.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
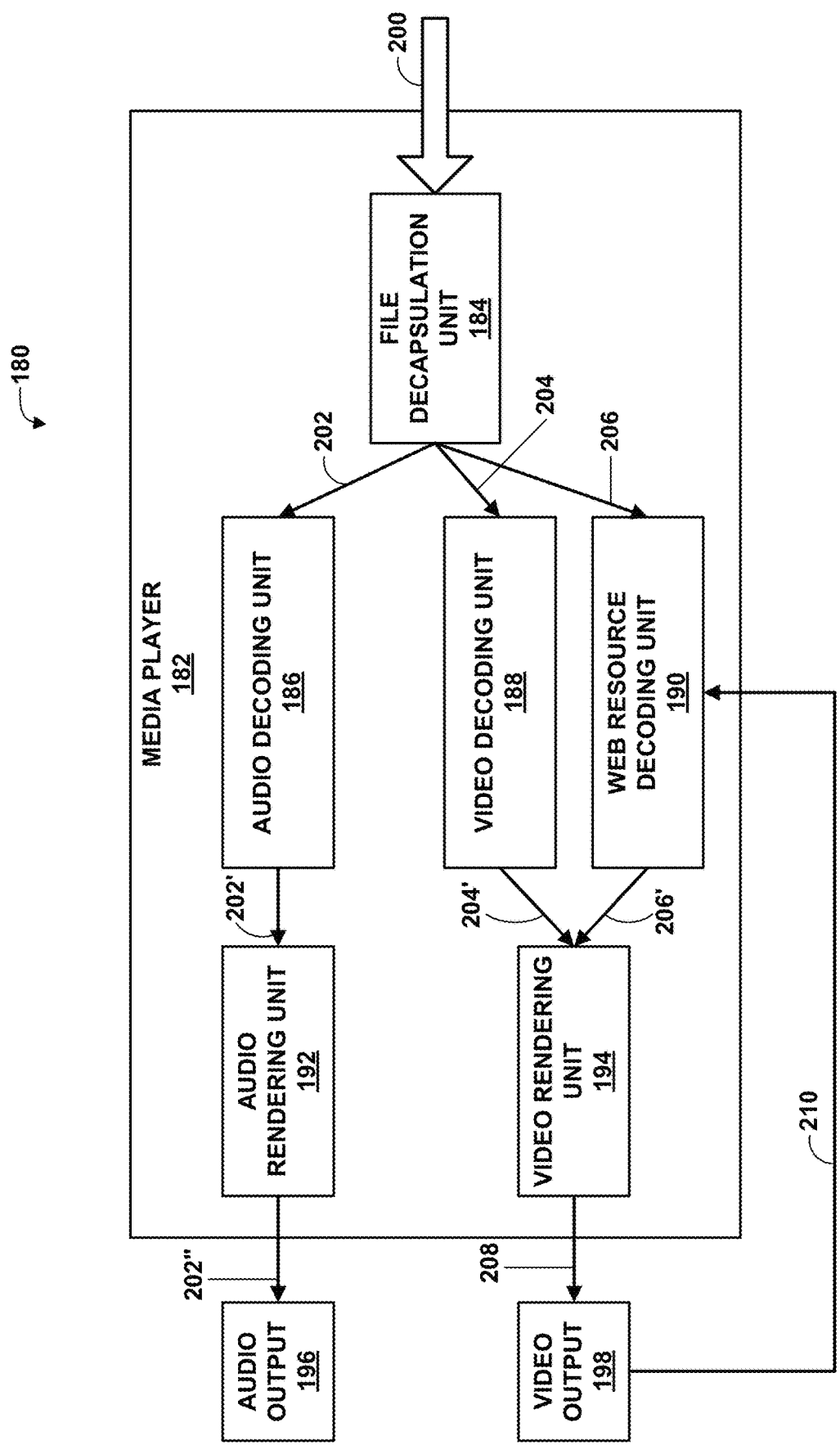
FIG. 5 is a conceptual diagram illustrating an example generic hypothetical processing model for web resources.

FIG. 5 is a conceptual diagram illustrating an example generic hypothetical processing model 180 for web resources. Processing model 180 of FIG. 5 may apply when a media player (such as a media player of client device 40 of FIG. 1, which may include portions of retrieval unit 52, decapsulation unit 50, audio decoder 46, and video decoder 48) integrates a Web engine (not shown in FIG. 1). In that case, the media player processes the ISO BMFF file, extracts stream samples and items, and processes the stream samples synchronously. The media player may instantiate the web engine to process web tracks. The media player may then combine decoded video data and rendered web engine data for final display, with frame accurate rendering.

Another version of processing model 180 may apply when the web engine is initiated, by loading some web content (e.g., an HTML page) and when that page loads, the media content (e.g., using a video and/or audio tag).

Processing model 180 of FIG. 5 includes media player 182 that receives ISO BMFF file 200, as well as audio output 196 and video output 198. Media player 182 includes file/segment decapsulation unit 184, audio decoding unit 186, video decoding unit 188, web resource decoding unit 190, audio rendering unit 192, and video rendering unit 194. File/segment decapsulation unit 184 decapsulates ISO BMFF file 200 and distributes encoded audio data 202 to audio decoding unit 186, encoded video data 204 to video decoding unit 188, and encoded web resource data 206 to web resource decoding unit 190. Audio decoding unit 186 passes decoded audio data 202' to audio rendering unit 192. Video decoding unit 188 passes decoded video data 204' to video rendering unit 194. Web resource decoding unit 190 passes decoded web resource data 206' to video rendering unit 194.

Audio rendering unit 192 renders decoded audio data 202', and passes rendered audio data 202" to audio output 196, which may correspond to speakers (e.g., loudspeakers and/or headphones, or other audio presentation devices). Video rendering unit 194 renders decoded audio data 204' and decoded web resource data 206' together and passes rendered video and web content 208 to video output 198, which may correspond to a display. Media player 182 may also receive interactivity data 210 defining interactions with the web content via one or more user interface devices (e.g., including an interactive touchscreen display such as video output 210, or other devices such as keyboard, mouse, or the like), and provide this data to web resource decoding unit 190.

The elements of FIG. 5 may generally correspond to the elements of client device 40 (FIG. 1). For example, file/segment decapsulation unit 184 may correspond to decapsulation unit 50, audio decoding unit 186 may correspond to audio decoder 46, video decoding unit 188 and web resource decoding unit 190 may correspond to video decoder 48, audio rendering unit 192 may correspond to elements of audio output 42, and video rendering unit 194 may correspond to elements of video output 44 (or other units of client device 40 not shown in FIG. 1). Alternatively, web resource decoding unit 190 may correspond to a web resource decoder of client device 40 not shown in FIG. 1.

Conceptually, in some examples, file decapsulation unit 184 may extract all resources stored as items in ISO BMFF file 200 and place these items in the cache of web resource decoding unit 190, using item_name as a URL for a corresponding item. These resources can then be available for downloads initiated by the Web engine (such as using the XmlHttpRequest or Fetch APIs). This may apply even in the case of streaming using ISO BMFF fragments, when items are delivered progressively by placing MetaBoxes in segments.

The same content may use either of the two example processing models discussed above. It should be noted that both models assume that the results of the execution of the JavaScript code contained in a sample of a JavaScript track are available at the presentation time of that sample, and similarly, that the rendering of HTML contained in an HTML overlay track sample is done at the presentation time of that sample. Concrete implementations may take into account processing delays to achieve synchronization and may prefetch resources that are not embedded in the file.

As an example, an ISO BMFF file may include an embedded HTML entry point for playing video content. Assume, for this example, that the web content is composed of the following HTML document (embedded inside the ISOBMFF file):

```
<!DOCTYPE html>
<html>
<head>
<script id="initScript">
//The following script is the entry point script.
//A simple example with 2 samples, the first one is a sync sample
and the second one non-sync sample
sampleCount = 2;
sampleDelta = 3000;
//Does 2 things: starts a "processing" method that contains the
logic to update the page based on data from sync and non-sync samples.
function init( )
{
   process( );
   function process( )
   {
      //The logic to update the page based on data from sync and non-sync
samples.
      updatePageUsingSampleData( );
      //Some example logic to call sample logic, application dependent
      setTimeout(function( ){sample0( )}, 0);
   }
   document.getElementById("heading").innerHTML="Initialized";
}
</script>
</head>
<body onload="init( )">
<h1 id="heading">Test Page</h1>
</body>
```

Figure 6:
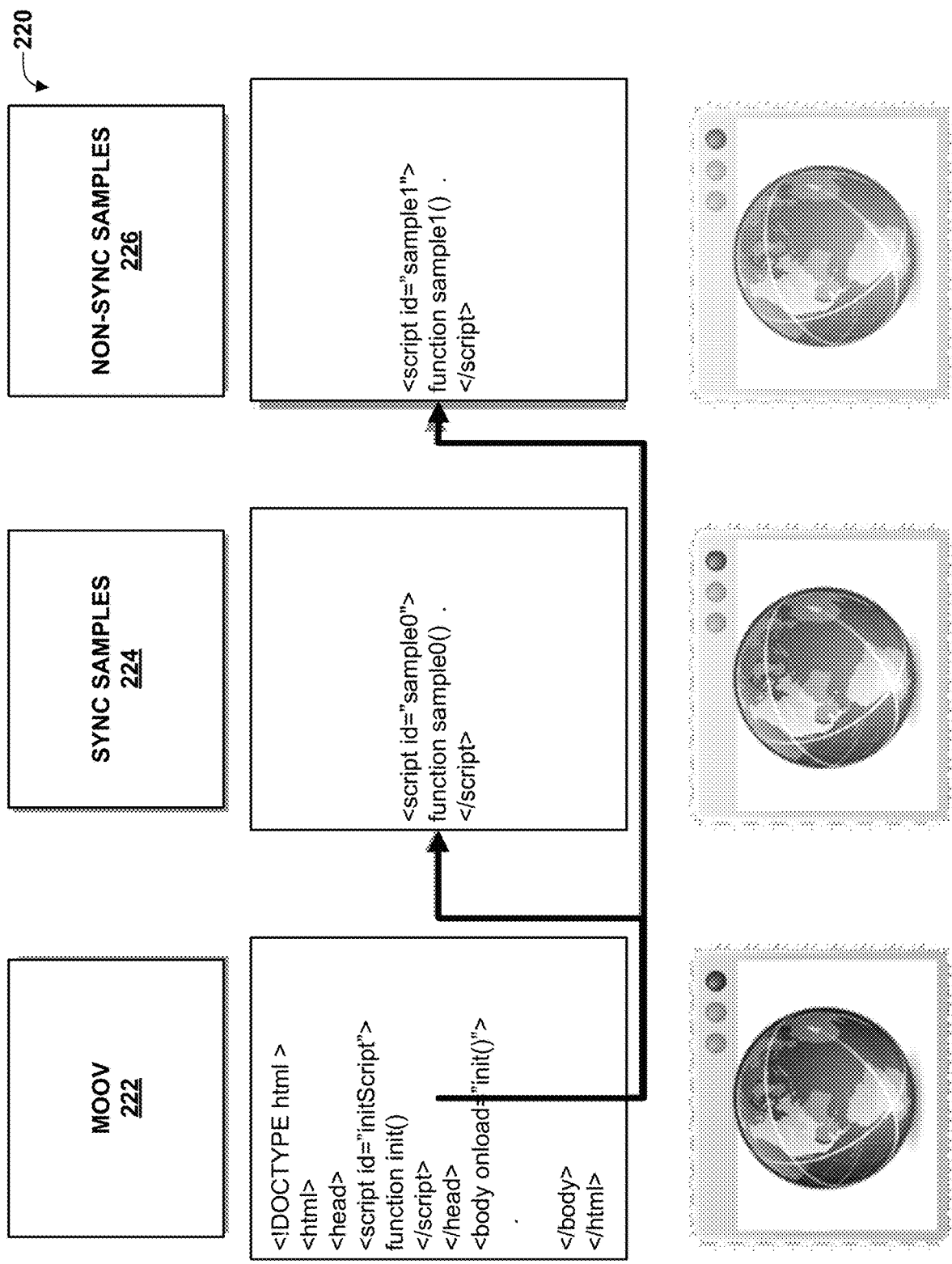
FIG. 6 is a conceptual diagram illustrating an example dynamic HTML data and process model description according to the techniques of this disclosure.

FIG. 6 is a conceptual diagram illustrating an example dynamic HTML data and process description of data model 220 according to techniques of this disclosure. In particular, FIG. 6 depicts an example of data model for the various pieces of data contained in the movie and track header (under 'moov' box 222), and as sync samples 224 and non-sync samples 226. A web browser (not shown) of retrieval unit 52 may load the initial HTML-conformant web page. The initial HTML conforming page may contain the processing logic to make use of the data contained in sync, redundant sync, and non-sync samples, in addition to carrying the common data for the track.

Figure 7:
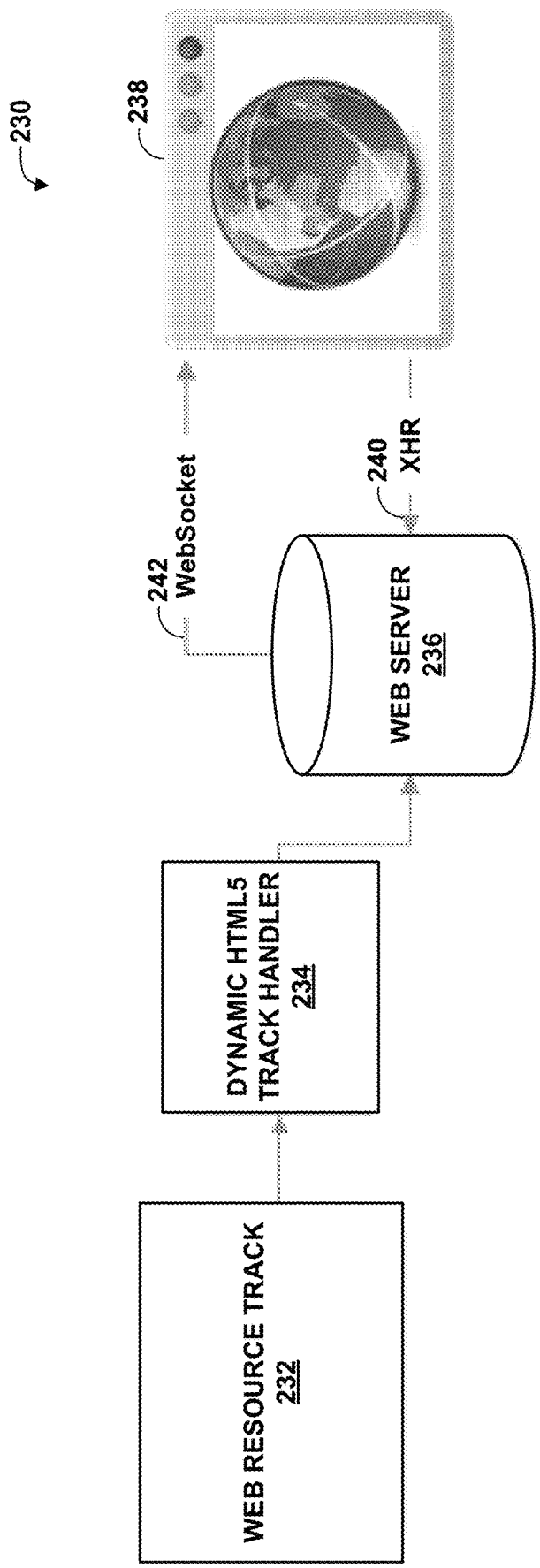
FIG. 7 is a flow diagram illustrating an example web resource process model.

FIG. 7 is a flow diagram illustrating an example web resource process model 230. In particular, process model 230 of FIG. 7 may be used with data model 220 of FIG. 6. This simplified diagram leaves out the corresponding multimedia (audio and video) track processing, but the rendering is expected to be synchronized with media. These details are left out since many further variations of this process model are possible (for example, where the audiovisual track data processing may also be handled by the contents/logic carried in the interactivity track).

In this example, two actions may be performed at a terminal (e.g., client device 40 of FIG. 1) to begin processing. First, dynamic HTML5 track handler 234 extracts an initial HTML document (the initial webpage) from the initial 'moov'/'meta' box of web resource track 232 and places the initial HTML document on the device-internal Web Server 236 (e.g., proxy server 102 of FIG. 2) or a cache (e.g., cache 104 of FIG. 2). Then, a web engine e.g., DASH client 110 of FIG. 2 or another web browser not shown in FIG. 2) receives data pointing to this page. The above two steps may be performed by another logic (not carried by the web resource track in question) at the terminal. This could, for example, be a main application or a webpage that lets the user select a content to play. In this case, the content in question contains the web resource track noted above, which may be embedded in the main webpage by using, for example, an I-frame.

After the web engine receives the data pointing to webpage 238 in the device-internal web server 236, the rest of the processing can be automated by the logic carried by the web resource track samples. The samples carried by the web resource tracks can be fetched by the initial HTML webpage using XHR 240 and/or be pushed to the HTML webpage 238 using Web Socket 242, as shown in FIG. 7. This logic may contain the functionality to load the samples from the internal web server 236 (using XHR) and/or from Web Socket 242 into the initial DOM and make appropriate usage of the data using the location information as specified above. In some examples, this logic may also contain other logic to perform additional functions at the terminal.

The content of (potentially redundant) sync and non-sync samples may be snippets of JavaScript code. The distinction between the sample types, in one example, is that data from non-sync sample may be added to the DOM, while the data in sync samples may replace corresponding data in the DOM. An example of how this can be realized is shown in the below:

1. A sync sample is an HTML element intended to replace an existing HTML element of the same type (that is, having a common type) and with the same id. Its id is set to "urn:mpeg:webresource:sync:<id>", where <id> is an optionally added string. The string prefix "urn: mpeg:webresource:sync:" shall be removed from the id by the client application before using this element.
   a. If an element of same type exists in the DOM, this element replaces the existing element.
   b. If multiple elements of this type exist in the DOM then
      i. this element replaces the element in the DOM with the same <id>.
      ii. If this element does not contain an <id>, all the elements of the same type are replaced with this element.
2. A non-sync sample is an HTML element that is added to the HTML body. Its id is set to "urn:mpeg:webresource:nonsync:<id>", where <id> is an optionally added string. The string prefix "urn:mpeg:webresource: nonsync:" shall be removed from the id by the client application before using this element.

In another example, if a redundant sync sample is used at initial playout, (e.g., as a result of a seek/play/tune-in) by the initial Webpage, only a single such sample should be loaded. A few implementation aspects should be considered.

For fetching via XHR using a polling mechanism, JavaScript samples may carry the sample duration in-band as the polling duration to be used by the processing logic, notwithstanding more techniques like usage of HTTP 2.0 server-push.

An HTML code example is given below with sample code embedded for a single sync and a non-sync sample. It does not contain the required processing logic to load samples for the sake of simplicity.

```
<!DOCTYPE html>
<html>
<head>
<script id="initScript">
//The following script is the entry point script.
//A simple example with 2 samples, the first one is a sync
sample and the second one non-sync sample
//This data is for the "process" module, not being fully used right now.
Rather the methods are called synchronously.
sampleCount = 2;
sampleDelta = 3000;
//Does 2 simple things: starts a "processing" method that contains the
logic
to update the page based on data from sync and non-sync samples.
function init( )
{
  process( );
  function process( )
  {
    //To do: Required: the logic to update the page based on data from
sync and non-sync samples.
    //Some example logic to call sample logic, application dependent
       setTimeout(function( ){sample0( )}, 0);
  }
  document.getElementById("heading").innerHTML="Initialized";
}
</script>
<script id="sample0">
//Simply display text and trigger the second sample with a timeout.
function sample0( )
{
  document.getElementById("heading").innerHTML="Sync Sample";
  setTimeout(function( ){sample1( )}, sampleDelta);
}
</script>
<script id="sample 1">
//Non-sync sample, change the text.
function sample1( )
{
  document.getElementById("heading").innerHTML ="Updated";
  console.log("Done");
}
</script>
</head>
<body onload ="init( )">
<h1 id="heading">Test Page</h1>
</body>
</html>
```

Figure 8:
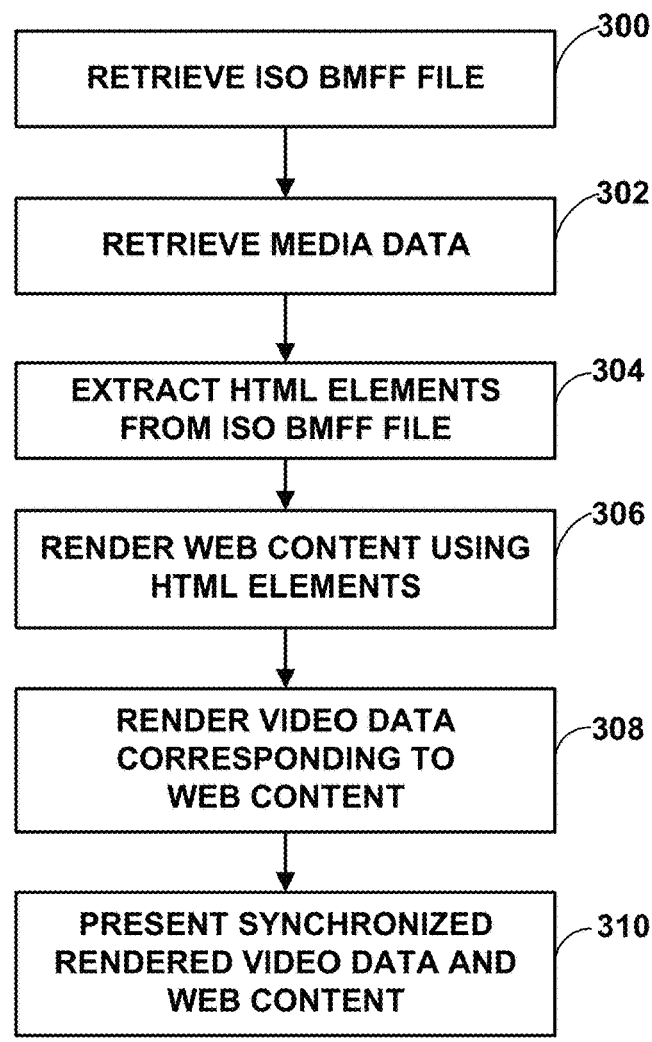
FIG. 8 is a flowchart illustrating an example method for performing techniques of this disclosure.

FIG. 8 is a flowchart illustrating an example method for performing techniques of this disclosure. The method of FIG. 8 is explained with respect to a device configured according to data model 180 of FIG. 5, although it should be understood that other devices may be configured to perform this or a similar method. For example, client device 40 of FIG. 1 may be configured to perform these techniques.

Initially, a device including media player 182 retrieves an ISO BMFF file (300). The ISO BMFF file includes one or more samples including hypertext markup language (HTML) elements defining dynamic web content. The HTML elements may include, for example, JavaScript elements, which may update HTML content for display.

Additionally, the device retrieves media data (302), such as audio and video data. In some examples, the media data may be included in the ISO BMFF file including the HTML elements, such that retrieving the ISO BMFF file includes retrieving both the HTML elements and the media data. In other examples, the media data may be included in one or more files that are separate from the ISO BMFF file including the HTML elements.

File decapsulation unit 184 may then extract HTML elements from the ISO BMFF file (304). In examples where the ISO BMFF file includes media data (e.g., audio and/or video data), file decapsulation unit 184 may also extract the media data from the ISO BMFF file. File decapsulation unit

184 may provide the media data to respective decoders. For example, file decapsulation unit 184 may provide encoded audio data 202 to audio decoding unit 186, encoded video data 204 to video decoding unit 188, and encoded web resource data 206 to web resource decoding unit 190. The various decoding units may then decode the encoded data and pass decoded data to respective rendering units. For example, audio decoding unit 186 may pass decoded audio data 202' to audio rendering unit 192, video decoding unit 188 may pass decoded video data 204' to video rendering unit 194, and web resource decoding unit 190 may pass decoded web resource data 206' to video rendering unit 194.

Video rendering unit 194 may then render web content (of decoded web resource data 206') and video data corresponding to the web content (308). For example, video rendering unit 194 may determine web content that is to be presented along with corresponding video data, e.g., as part of one or more frames of the video data, and render pictures including both video data and corresponding web content. Additionally, audio rendering unit 192 may render decoded audio data 202'. Video rendering unit 194 provides rendered video and web content 208 to video output 198, while audio rendering unit 192 provides rendered audio data to audio output 196.

Ultimately, video output 198 may present synchronized rendered video data and web content 208 (310). That is, the video data and web content may be synchronized, due to synchronization performed by, e.g., video rendering unit 194.

In this manner, the method of FIG. 8 represents an example of a method including retrieving an ISO Base Media File Format (ISO BMFF) file including one or more samples including hypertext markup language (HTML) elements defining dynamic web content, extracting the HTML elements from the samples of the file, and processing the HTML elements to present the dynamic web content.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:
retrieving an International Organization for Standardization Base Media File Format (ISO BMFF) file including one or more samples including hypertext markup language (HTML) elements defining dynamic web content, wherein retrieving the ISO BMFF file includes:
determining a template uniform resource locator (URL) defining a field to be substituted with sample numbers to construct URLs for the samples;
determining a sample number for one of the samples to be retrieved;
substituting the sample number in the field of the template URL to construct a URL for the one of the samples; and
submitting a request specifying the constructed URL to retrieve the one of the samples;
extracting the HTML elements from the samples of the file;
processing the HTML elements to present the dynamic web content;
extracting HTML content from a meta information box of an initial movie (MOOV) box of the file; and determining that the extracted HTML content is immutable in response to extracting the HTML content from the meta information box.

2. The method of claim 1, wherein the HTML elements comprise JavaScript elements for updating HTML content of the HTML elements.

3. The method of claim 1, wherein the file comprises a fragmented ISO BMFF file including a web resource track, the web resource track including the HTML elements.

4. The method of claim 1, wherein presenting the media data comprises updating a presentation of the HTML, elements in response to updates to the HTML, content of the HTML elements.

5. The method of claim 1, further comprising determining that a sample of the HTML elements is a sync sample when an identifier for the sample is preceded by "urn: m peg: webresource:sync:".

6. The method of claim 5, further comprising removing "urn:mpeg:webresource:sync:" from the identifier.

7. The method of claim 5, wherein the sample has a type, and wherein the sample comprises a new element, the method further comprising:
determining that an existing element of the type exists in a document object model (DOM) for the file; and
in response to the determination, replacing the existing element with the new element in the DOM.

8. The method of claim 5, wherein the sample has a type, and wherein the sample comprises a new element, the method further comprising:
determining that a plurality of existing elements of the type exist in a document object model (DOM) for the file; and
in response to the determination:
determining one of the existing elements having an identifier equal to the identifier for the new element; and
replacing the one of the existing elements with the new element in the DOM.

9. The method of claim 5, wherein the sample has a type, and wherein the sample comprises a new element, the method further comprising:
determining that a plurality of existing elements of the type exist in a document object model (DOM) for the file; and
in response to the determination:
determining that the identifier for the new element does not include any data following the "urn: mpeg: webresource: sync:"; and
in response to the determination, replacing each of the existing elements of the type with the new element in the DOM.

10. The method of claim 5, wherein presenting comprises updating at least part of a webpage of the dynamic web content using the sample.

11. The method of claim 1, further comprising determining that a sample of the HTML elements is a non-sync sample when an identifier for the sample is preceded by "urn:mpeg:webresource:nonsync:".

12. The method of claim 11, further comprising removing "urn:mpeg:webresource:nonsync:" from the identifier.

13. The method of claim 11, wherein presenting comprises adding additional content from the non-sync sample to a webpage of the HTML elements.

14. The method of claim 1, wherein presenting comprises:
determining whether samples of the HTML elements are sync samples or non-sync samples; and
forwarding the samples and data indicating whether the samples are sync samples or nonsync samples to a JavaScript service worker of a media presentation application.

15. The method of claim 1, further comprising:
determining that the HTML elements reference one or more side data elements for rendering a webpage of the HTML elements; and
extracting the side data elements from HTML data of the HTML elements, wherein the side data elements are provided in-band with the HTML elements.

16. The method of claim 15, wherein the side data elements include an image, and wherein extracting comprises extracting a base64 representation of the image from the HTML data of the HTML elements.

17. The method of claim 1, wherein the file includes a dynamic HTML5 track including the HTML elements.

18. The method of claim 1, wherein the file includes a value of "dhtm" to signal the presence of one or more tracks having constraints including that a track handler for the tracks is "text," a sample entry format for the tracks is "stxt," a mime format field is set to "text/html" or "application/xhtml+xml," and a content_encoding field contains either an empty string or a value allowed according to the content-encoding header of HTTP.

19. The method of claim 1, wherein the file includes an initial HTML conforming page, one or more sync samples, and one or more non-sync samples.

20. The method of claim 19, wherein the file includes the initial HTML conforming page in a movie "MOOV" box of the file.

21. The method of claim 19, wherein the initial HTML conforming page includes an init( ) function for accessing the sync samples and non-sync samples.

22. The method of claim 19, wherein the method is performed by a client device, the method further comprising:
extracting, by the client device, the initial HTML conforming page from the file;
storing, by the client device, the initial HTML conforming page to a web server internal to the client device; and
sending, by the client device, data pointing to the initial HTML conforming page to a web engine executed by the client device.

23. The method of claim 19, wherein the sync and non-sync samples each include respective snippets of JavaScript code.

24. The method of claim 19, wherein the sync samples comprise HTML elements that replace existing HTML elements of a common type and identifier, the identifier being formed according to "urn:mpeg:webresource:sync:<id>," wherein the "<id>" value is optional, the method further comprising removing the prefix "urn:mpeg:webresource:sync:" from the identifier prior to using the HTML elements.

25. The method of claim 24, further comprising, when a document object model (DOM) includes a single element of the same type as one of the sync samples, replacing the element in the DOM with the element of the one of the sync samples.

26. The method of claim 24, further comprising, when a document object model (DOM) includes multiple elements of the same type as one of the sync samples:
replacing the element in the DOM with the sync sample having the same identifier "<id>," or when the element does not have the optional "<id>" value, replacing each of the multiple elements in the DOM of the same type with the element of the one of the sync samples.

27. The method of claim 19, wherein the non-sync samples comprise HTML, elements added to an HTML body, the method further comprising:
determining identifiers for the HTML elements as "urn:mpeg:webresource:nonsync:<id>", wherein the "<id>" value is optional; and
Removing the prefix "urn:mpeg:webresource:nonsync:" from the identifiers before using the HTML elements of the non-sync samples.

28. The method of claim 1, wherein retrieving the ISO BMFF file includes retrieving, by a web browser of a client device, the web browser executed by a processor implemented in circuitry, the samples including the HTML elements from a local cache or a proxy server of the client device.

29. The method of claim 28, wherein retrieving comprises retrieving the samples via XMLHttpRequest (XHR).

30. The method of claim 28, wherein retrieving comprises retrieving the samples via a WebSocket.

31. The method of claim 28, wherein the samples are available to the web browser no later than at respective sample decode times.

32. The method of claim 28, wherein retrieving comprises determining relative URLs for the samples from data included in one or more file format boxes in movie fragments carrying the samples.

33. The method of claim 32, wherein the file format boxes comprise sample URL boxes including relative URLs of the corresponding samples.

34. The method of claim 1, wherein a track header of a track including the samples includes the template URL.

35. The method of claim 34, wherein the track header specifies a maximum sample number value, and wherein determining the sample number comprises:
incrementing a previous sample number to a new sample number; and
calculating the sample number as the new sample number modulo the maximum sample number value.

36. The method of claim 34, wherein the field comprises $number$.

37. The method of claim 1, wherein a track header of a track including the samples includes a template URL defining a field to be substituted with a decode time of a corresponding sample to create URLs for the samples, wherein retrieving comprises:
determining a decode time for one of the samples to be retrieved;
substituting the decode time in the field of the template URL to construct a URL for the one of the samples; and
submitting a request specifying the constructed URL to retrieve the one of the samples.

38. The method of claim 37, wherein the field comprises $time$.

39. The method of claim 1, further comprising determining a WebSocket address from a web resource track header of a track of a file including the HTML, elements.

40. A device for processing media data, the device comprising:
a memory configured to store an International Organization for Standardization Base Media File Format (ISO BMFF) file including one or more samples including hypertext markup language (HTML) elements defining dynamic web content; and
a processing unit implemented in circuitry and configured to:
retrieve the ISO BMFF file, wherein to retrieve the ISO BMFF file, the processing unit is configured to:
determine a template uniform resource locator (URL) defining a field to be substituted with sample numbers to construct URLs for the samples;
determine a sample number for one of the samples to be retrieved;
substitute the sample number in the field of the template URL to construct a URL for the one of the samples; and
submit a request specifying the constructed URL to retrieve the one of the samples;
extract the HTML elements from the samples of the file;
process the HTML elements to present the dynamic web content;
extract HTML content from a meta information box of an initial movie (MOOV) box of the file; and
determine that the extracted HTML content is immutable in response to extracting the HTML content from the meta information box.

41. The device of claim 40, wherein the HTML elements comprise JavaScript elements for updating HTML content of the HTML elements.

42. The device of claim 40, wherein the file comprises a fragmented ISO BMFF file including a web resource track, the web resource track including the HTML elements.

43. A device for processing media data, the device comprising:
means for retrieving an International Organization for Standardization Base Media File Format (ISO BMFF) file including one or more samples including hypertext markup language (HTML) elements defining dynamic web content, wherein the means for retrieving the ISO BMFF file include:
means for determining a template uniform resource locator (URL) defining a field to be substituted with sample numbers to construct URLs for the samples;
means for determining a sample number for one of the samples to be retrieved;
means for substituting the sample number in the field of the template URL to construct a URL for the one of the samples; and
means for submitting a request specifying the constructed URL to retrieve the one of the samples;
means for extracting the HTML elements from the samples of the file;
means for processing the HTML elements to present the dynamic web content;
means for extracting HTML content from a meta information box of an initial movie (MOOV) box of the file; and
means for determining that the extracted HTML content is immutable in response to extracting the HTML content from the meta information box.

44. The device of claim 43, wherein the HTML elements comprise JavaScript elements for updating HTML content of the HTML elements.

45. The device of claim 43, wherein the file comprises a fragmented ISO BMFF file including a web resource track, the web resource track including the HTML elements.

46. A non-transitory computer-readable storage medium having stored thereon instructions that, when executed, cause a processor to:

retrieve an International Organization for Standardization Base Media File Format (ISO BMFF) file including one or more samples including hypertext markup language (HTML) elements defining dynamic web content, wherein the instructions that cause the processor to retrieve the ISO BMFF file include instructions that cause the processor to:

determine a template uniform resource locator (URL) defining a field to be substituted with sample numbers to construct URLs for the samples;

determine a sample number for one of the samples to be retrieved;

substitute the sample number in the field of the template URL to construct a URL for the one of the samples; and submit a request specifying the constructed URL to retrieve the one of the sample;

extract the HTML elements from the samples of the file;

process the HTML elements to present the dynamic web content;

extract HTML content from a meta information box of an initial movie (MOOV) box of the file; and determine that the extracted HTML content is immutable in response to extracting the HTML content from the meta information box.

47. The non-transitory computer-readable storage medium of claim 46, wherein the HTML elements comprise JavaScript elements for updating HTML content of the HTML elements.

48. The non-transitory computer-readable storage medium of claim 46, wherein the file comprises a fragmented ISO BMFF file including a web resource track, the web resource track including the HTML elements.

* * * * *